United States Patent
Kouyama

(10) Patent No.: US 7,614,292 B2
(45) Date of Patent: Nov. 10, 2009

(54) METHOD AND DEVICE FOR DETECTING DEFECT IN OUTER SHAPE OF TIRE SIDE PORTION

(75) Inventor: Kenji Kouyama, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 90 days.

(21) Appl. No.: 11/912,223

(22) PCT Filed: Apr. 21, 2006

(86) PCT No.: PCT/JP2006/308423

§ 371 (c)(1),
(2), (4) Date: Nov. 13, 2007

(87) PCT Pub. No.: WO2006/115203

PCT Pub. Date: Nov. 2, 2006

(65) Prior Publication Data

US 2009/0071236 A1    Mar. 19, 2009

(30) Foreign Application Priority Data

Apr. 22, 2005    (JP) .............................. 2005-124872

(51) Int. Cl.
*G01M 17/02*    (2006.01)
(52) U.S. Cl. .................. 73/146; 73/8; 702/148
(58) Field of Classification Search .................. 73/146, 73/7, 8; 702/148
See application file for complete search history.

(56) References Cited

U.S. PATENT DOCUMENTS

| | | | | |
|---|---|---|---|---|
| 4,258,567 A | * | 3/1981 | Fisher, III | ..................... 73/146 |
| 5,313,827 A | | 5/1994 | Yovichin | |
| 6,065,331 A | * | 5/2000 | Fukasawa | ..................... 73/146 |
| 6,539,789 B1 | * | 4/2003 | Kostka et al. | ................. 73/146 |

FOREIGN PATENT DOCUMENTS

| | | |
|---|---|---|
| JP | 5067671 A | 6/1975 |
| JP | 63267151 A | 11/1988 |
| JP | 64006715 A | 11/1989 |
| JP | 10160453 A | 6/1998 |
| JP | 2003266445 | 9/2003 |
| JP | 200436144 A | 12/2004 |
| JP | 2004361344 | 12/2004 |
| WO | 02/48648 A1 | 6/2002 |

* cited by examiner

*Primary Examiner*—Andre J Allen
(74) *Attorney, Agent, or Firm*—Sughrue Mion, PLLC

(57) ABSTRACT

Repeated small irregularity, i.e. defect in outer shape on a sidewall portion S of a pneumatic tire T is detected. An order analysis is performed in higher order by an order analysis means 24 based on a waveform measured the irregularity on the sidewall portion S of the pneumatic tire T along the circumferential direction to calculate the value of the small irregularity at this order, and then the defect in outer shape is decided if the value of the small irregularity exceeds an allowable value. Thus, a pneumatic tire T of which small irregularity of certain order exceeding the allowable value is repeatedly formed in the circumferential direction on the sidewall portion S can be easily and certainly rejected as a defective tire.

9 Claims, 1 Drawing Sheet

METHOD AND DEVICE FOR DETECTING DEFECT IN OUTER SHAPE OF TIRE SIDE PORTION

This application is a National Stage of International Application No. PCT/JP2006/308423 filed on Apr. 21, 2006, claiming priority based on Japanese Patent Application No. 2005-124872, filed Apr. 22, 2005, the contents of all of which are incorporated herein by reference in their entirety.

TECHNICAL FIELD

The present invention relates to a method and device for detecting a defect in an outer shape of a sidewall portion or a tire side portion of a pneumatic tire.

RELATED ART

A conventional method and device for detecting a defect in an outer shape of a tire side portion is known from, for example, the following patent document 1.

Patent Document 1: Japanese Patent Application Laid-open No. S64-6715 (JP-64006715-A)

The method and device described in this document comprises the steps of measuring irregularity of a sidewall portion of a pneumatic tire along the circumferential direction, eliminating an effect of intentional irregularity, such as a character or a line, from a waveform of the result of the above measurement, and determining a defect of the sidewall portion if the waveform after the above-mentioned eliminating step exceeds a standard value at any portion. In this way, the conventional method and device detect abnormal irregularity randomly occurred at one or more places on the circumference of the sidewall and reject a pneumatic tire having such abnormal irregularity as one having a defect in outer shape.

DISCLOSURE OF THE INVENTION

Problems to be Solved by the Invention

For turning back a tire-component member constituting a pneumatic tire, a bladder has been conventionally used. In recent years, a mechanical means of turning back the tire component member is proposed. When the tire component member is turned back by the mechanical means, small irregularity is repeatedly formed on a flat part of the sidewall portion on which intentional irregularity is not provided. However, user's demands for defective appearance of a pneumatic tire become higher along with the vehicle getting more luxury, so that the users may complain about the small repeated irregularity.

The object of the present invention is to provide a method and apparatus for detecting a defect in an outer shape of a tire side portion, which can detect the above-mentioned repetitive small irregularity, i.e. defect in the outer shape of the tire side portion.

MEANS FOR SOLVING THE PROBLEM

The object can be achieved by comprising the steps of measuring irregularity of a sidewall portion of a pneumatic tire along the circumferential direction, performing an order analysis in higher order based on the waveform of the result of said measurement by an order analysis means to calculate a value of the irregularity at this order, and comparing the value of irregularity with a preset acceptable value to decide a defect of the sidewall portion by a determining means if the value of the irregularity exceeds the acceptable value.

EFFECT OF THE INVENTION

In the present invention, an order analysis in higher order is performed on the basis of a waveform obtained by measuring irregularity of a tire side portion along the circumferential direction to calculate the value of irregularity at this order, and if the value of irregularity exceeds the acceptable value, a defect in an outer shape is determined. Thus, a pneumatic tire in which small irregularity at a certain order exceeding the acceptable value is repeatedly formed on the tire side portion in the circumferential direction can be easily and certainly rejected.

When the method is configured according to claim 2, the order analysis can be performed with a relatively simple configuration but with high accuracy. In addition, from the above-mentioned reason in manufacturing, the repeated small irregularity tends to occur in the range of order recited in claims 3 and 4, and the small irregularity within this range is likely to be highly visible depending on the intensity of light, so that the order analysis is preferably performed within this order range.

DESCRIPTION OF SYMBOLS 20 measurement means
24 order analysis means
30 determining means
T pneumatic tire
S sidewall portion

BEST MODE FOR CARRYING OUT THE INVENTION

Figure 1:
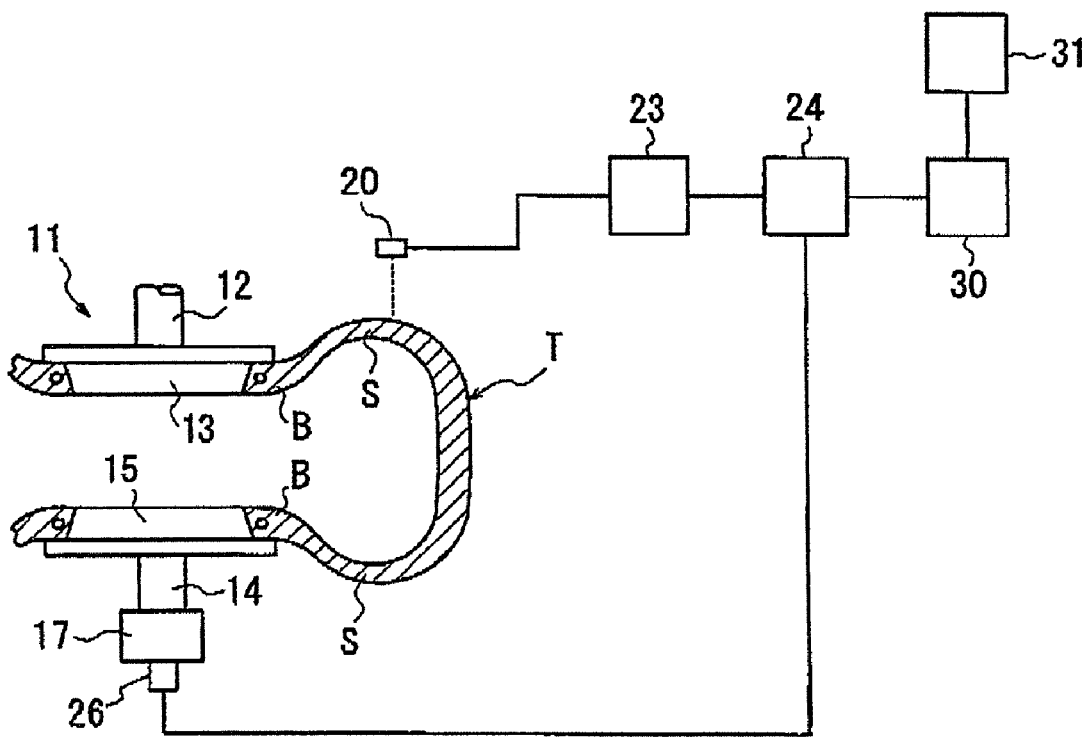
FIG. 1 is a front sectional view of one embodiment of the present invention with some of the parts being shown as blocks.
Figure 2:
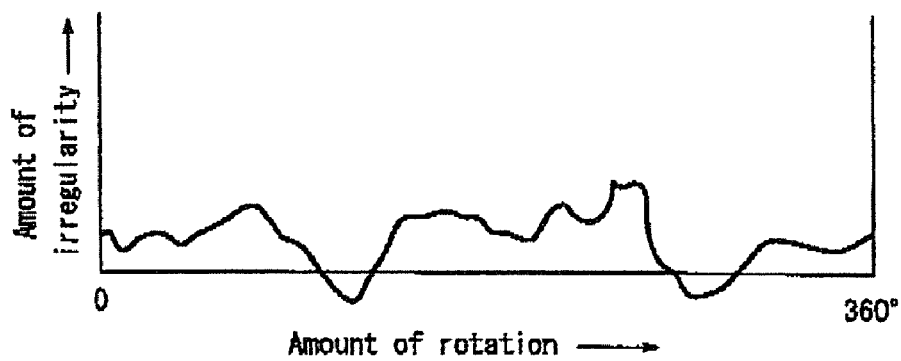
FIG. 2 is a waveform chart showing a measured waveform of the irregularity on the sidewall portion during one turn of the tire.

In the next, embodiments of the present invention will be discussed with reference to the drawings. In FIGS. 1 and 2, the reference numeral 11 denotes a tire inspection device, and the tire inspection device 11 has a rotatable upper spindle 12 which is extendable in vertical direction. An upper rim 13 is fixed at the lower end of the upper spindle 12, and a bead portion B of one side (upper side) of a horizontally laid pneumatic tire T to be inspected is mounted on the upper rim 13. The tire inspection device 11 has a lower spindle 14 which is situated right below the upper spindle 12 and is coaxial with the upper spindle 12. Fixed at the upper end of the lower spindle 14 is a lower rim 15 on which a bead portion B of the other side (lower side) of the above-mentioned pneumatic tire T is mounted To the lower spindle 14, a not-shown piston rod of a cylinder and an output shaft of a motor 17 are connected. As a result, the lower spindle 14, the lower rim 15 and the motor 17 are integrally moved up or down when the piston rod of the cylinder is projected or retracted, while the lower and upper spindles 14, 12, lower and upper rim 15, 13 and pneumatic tire T are integrally rotated around the vertical axis when the motor 17 is operated.

The reference numeral 20 denotes a non-contact type laser displacement meter as a measuring means which is arranged directly above one (upper) sidewall portion S of the above-mentioned pneumatic tire T. The laser displacement meter 20 emits a straight laser beam to the outer surface of the one sidewall portion S of the pneumatic tire T and receives a reflected laser beam from the one sidewall portion S. In this context, if the pneumatic tire T is relatively rotated by the operation of the motor 17 with respect to the laser displacement meter 20, the laser displacement meter 20 measures the irregularity on the outer surface of the one sidewall portion S of the pneumatic tire T along the circumferential direction based on the reflected laser beam. Shown in FIG. 2 is a waveform of the irregularity (amplitude) on the outer surface of the one sidewall S while the pneumatic tire T makes one rotation.

The reference numeral 23 denotes an amplifier for amplifying a measurement signal (measurement result) from the laser displacement mater 20, and the measurement signal amplified by the amplifier 23 is output to an order analysis means 24 including, for example, an FFT (Fast Fourier Transformer) analyzer. The reference numeral 26 denotes an encoder attached to the output shaft of the motor 17, and the encoder 26 detects a rotation of the motor 17 and outputs the detected result as a rotation signal to the order analysis means 24.

When the measurement signal and the rotation signal are input to the order analysis means 24 in the above-mentioned manner, the order analysis means 24 cuts out the waveform of the measurement result corresponding to one rotation of the pneumatic tire T and then the cutout waveform of the measurement result is subjected to the Fourier transformation. In this way, the order analysis in higher order based on the waveform of the measurement result is performed to give a value of small irregularity at this order. By subjecting the waveform of the measurement result to the Fourier transformation, the order analysis can be performed with a simple configuration at high accuracy. In this context, the "higher order" means two or more cyclic fluctuations during one rotation of the tire, and, for example, tenth order means the fluctuation is cyclically observed 10 times, and twentieth order means the fluctuation is cyclically observed 20 times.

In a case where the pneumatic tire T is for a passenger vehicle, the above-mentioned order analysis is preferably performed at least one order within 40+/−5 order. This is because repeated small irregularity tends to occur on the sidewall portion S within such order range due to the above-mentioned reason in manufacturing and the small irregularity within this order range can be easily distinguished.

Meanwhile, in a case where the pneumatic tire T is for truck and bus, the above-mentioned order analysis is preferably performed at least one order within 60+/−5 order. This is because repeated small irregularity tends to occur on the sidewall portion S within such order range due to the above-mentioned reason in manufacturing and die small irregularity within this order range can be easily distinguished.

The value of small irregularity of each order subjected to the order analysis by the order analysis means 24 is output from the order analysis means 24 to the determining means 30. The reference numeral 31 denotes a setting means storing preset allowable values for each order which is, for example, 0.1 mm for each order in case of tires for track and bus. The necessary allowable value is appropriately out put from the setting means 31 to the determining means 30. After the value of the small irregularity of each order is input to the determining means 30 in the above-mentioned manner, the determining means 31 compares the value of the small irregularity with the allowable value of the corresponding order input from the setting means 31. If the value of the small irregularity exceeds the allowable value in at lease one order, then the determining means 30 determines the sidewall S as being suffered a defect in outer shape.

In this embodiment, values of small irregularity are determined for each order and the defect in outer shape is detected on the basis of these values, but it is understood that based on the above-mentioned result of the measurement with the laser displacement meter 20, the defects in outer shape such as irregular abnormal irregularity on the sidewall portion or abnormal lateral runout (waggle) may be detected. In this way, several kinds of defects can be detected by one existence facility.

Then, the action of the above-mentioned embodiment will be described. When the horizontally laid pneumatic tire T for a passenger vehicle is transferred to directly above the lower rim 15 by a not-shown transfer means such as a conveyor, the piston rod of the cylinder is projected and the lower spindle 14 is elevated until the other side (lower side) bead portion B of the pneumatic tire T is sit on the lower rim 15. After that, the piston rod of the cylinder remains projected, so that the lower spindle 14, lower rim 15 and pneumatic tire T are altogether elevated. The projection of the piston rod stops when the one side (upper side) bead B of the pneumatic tire T is sat on the upper rim 13. In this way, the pneumatic tire T is mounted on the tire inspection device 11.

Then, the motor 17 is operated to integrally rotate the lower and upper spindles 14, 12, the lower and upper rim 15, 13, and the pneumatic tire T while the irregularity on the outer surface of the one sidewall portion S is measure along the circumferential direction by the laser displacement meter 20. In this connection, the measurement signal (measurement result) from the laser displacement meter 20 is amplified by the amplifier 23, then is out put to the order analysis means 24. At the same time, the rotation signal from the encoder 26 is out put to the order analysis means 24. Hereby, the order analysis means 24 cuts out the waveform of the measurement result corresponding to one rotation of the tire and subjects the cutout waveform of the measurement result to the Fourier transformation to perform order analysis in higher order, and in this embodiment in all orders within a range of 40+/−5, based the waveform of the measurement result. This will give the values of small irregularity for each order.

The values of small irregularity determined in this way for each order are out put from the order analysis means 24 to the determining means 30. On this occasion, the allowable values (0.1 mm) in each order are input from the setting means 31 to the determining means 30, so that the determining means 30 compares the values of the above-mentioned small irregularity with the allowable values, and determines the sidewall portion S as being suffered a defect in outer shape if the value of the small irregularity exceeds the allowable value in at least one order. In this way, when a pneumatic tire T being suffered the defect in outer shape, in which small irregularity in a certain order exceeding the allowable value is repeatedly formed on the sidewall portion S along the circumferential direction, is found, it is displayed on a not-shown indicator and the pneumatic tire is easily and certainly rejected from the product line as a defective tire.

In the above-mentioned embodiment, the laser displacement meter 20 remains stationary while the pneumatic tire T rotates, which allows the relative rotation of them to, thereby, measure the irregularity on the sidewall portion S along the circumferential direction by the laser displacement meter S. It is, however, understood that in the present invention, the pneumatic tire may remain stationary while the measurement means rotates, which also allows the relative rotation of them, to, thereby, measure the irregularity on the sidewall portion S along the circumferential direction by the measurement means.

Further, in the above-mentioned embodiment, a laser displacement meter 20 capable of emitting a straight laser beam is used as a measurement means to measure the irregularity on the sidewall portion S along a single circle. It is, however, understood that in the present invention, a two-dimensional laser displacement meter emitting a curtain (planar) laser beam which spreads out in a fan-like form may be used. In this case, the irregularity on the sidewall portion S can be measured on several concentric circles having different diameters.

Furthermore, in the above-mentioned embodiment, an FFT analyzer is used as an order analysis means 24. It is, however, understood that in the present invention, band-pass filters provided for each order to be analyzed may be used. In addition, in the above-mentioned embodiment, the laser displacement meter 20 measures the irregularity on the sidewall portion S in the one side, but, in the present invention, the measurement means may measure the irregularity only on the sidewall portion in the other side, or a pair of measurement means are provided to simultaneously measure the irregularity on the sidewall portions S in the one and other sides.

Moreover, in the above-mentioned embodiment, an order analysis is performed for plural orders (all orders within 40+/−5 orders) and then the defect in outer shape is determined on the basis of the result of the order analysis. It is, however, understood that in the present invention, the order analysis may be performed for a single order at which abnormal small irregularity most frequently occurs and then the defect in outer shape may be determined on the basis of the result of the order analysis.

It is noted that the cyclic irregularity in higher order occurred on the sidewall of the tire is likely to be caused by other reasons than turning back tire component member by a mechanical means. For example, there is known a method for building a tire in which carcass members and inner liner members of the tire are formed on a lire-building drum by preparing strip members which have widthwise sides of the lengths corresponding to periphery lengths of these members in the transversal section of the product tire, and circumferential sides of the lengths being one inch times circle ratio π (plus overlap space), and arranging multiple pieces of strip members in the tire circumferential direction where the number of the snip members corresponding to a nominal diameter (inches) of the tire. In this method, seams formed between the strip members adjacent in the tire circumferential direction cyclically appear, which is likely to form circumferential irregular element of the order corresponding to a nominal diameter (inch) of the tire. In this case, performing the Fourier analysis at the order corresponding to the nominal diameter (inch) of the tire can easily provide an inspection of the irregular element of this order.

The order of the irregularity of the higher order element caused by turning back the tire component members with a mechanical means depends on the number of turning-back blades arranged in the tire circumferential direction. Thus, in this case also, performing the Fourier analysis at the order corresponding to the number of the blades can easily provide irregular elements of this order.

Further, the higher order element of the order combining the above-mentioned causes is likely to be dominant. In that case, it is likely to appear as common multiple of the orders corresponding to individual causes (in the case where all the peaks of causes appear as irregularity), or as a common denominator (in the case where the irregularity will appear when the peaks of the causes overlap).

INDUSTRIAL APPLICABILITY

The present invention can be applicable to an industrial field of detecting a defect in outer shape on a sidewall portion of a pneumatic tire.

The invention claimed is:

1. A method for detecting a defect in an outer shape of a side portion of a pneumatic tire formed by turning back tire component members with turning-back blades, comprising;
   measuring irregularity of the outer shape of the side portion along a circumferential direction of the pneumatic tire,
   performing an order analysis in higher order corresponding to the number of the turning-back blades based on a waveform of the result of said measurement to calculate a value of the irregularity at this order, and
   comparing the value of irregularity with a preset acceptable value to decide a defect of the side portion if the value of the irregularity exceeds the acceptable value.

2. The method for detecting a defect in outer shape of a side portion of a pneumatic tire according to claim 1, wherein said order analysis is performed by subjecting the waveform of the measurement result to the Fourier transformation.

3. The method for detecting a defect in outer shape of a side portion of a pneumatic tire according to claim 1, wherein said order analysis is performed at least one order within 40+/−5 order in a case of a pneumatic tire being for a passenger vehicle.

4. The method for detecting a defect in outer shape of a side portion of a pneumatic tire according to claim 1, wherein said order analysis is performed at least one order within 60+/−5 in a case of the pneumatic tire being for truck and bus.

5. A device for use in the method for detecting a defect in the outer shape of a side portion of a pneumatic tire according to any one of claims 1 to 4, comprising:
   a measurement device which measures irregularity of the outer shape of the side portion along a circumferential direction of the pneumatic tire by relatively rotating the pneumatic tire;
   an order analysis device which performs an order analysis in higher order based on a waveform of the measurement result from the measurement device to calculate the value of the irregularity at this order; and
   a determining device which compares the value of irregularity with a preset acceptable value to decide a defect of the sidewall portion if the value of the irregularity exceeds the acceptable value.

6. A method for detecting a defect in an outer surface of a sidewall portion of a pneumatic tire formed by turning back tire component members with turning-back blades, comprising:
   relatively rotating a pneumatic tire and a measuring device;
   measuring irregularities on the outer surface of the sidewall portion of the pneumatic tire in a circumferential direction as the tire and the measuring device rotate relatively;
   plotting the irregularities to create a waveform of an amplitude of the irregularities versus an angle of rotation of the tire relative to the measuring device;
   performing an order analysis on the waveform having an order corresponding to the number of the turning-back blades to calculate an amplitude of a cyclical irregularity on the outer surface of the sidewall portion of the tire; and
   determining whether the amplitude of the cyclical irregularity exceeds a predetermined allowable value.

7. A method according to claim 6, wherein the irregularities that are measured comprise a displacement of the outer surface of the sidewall portion of the pneumatic tire.

8. A method according to claim 6, wherein the order analysis comprises subjecting the waveform to a Fourier transformation.

9. A method according to claim 6, wherein the order analysis comprises removing from the waveform irregularities having an occurrence rate equal to one per rotation of the pneumatic tire.

* * * * *